UNITED STATES PATENT OFFICE.

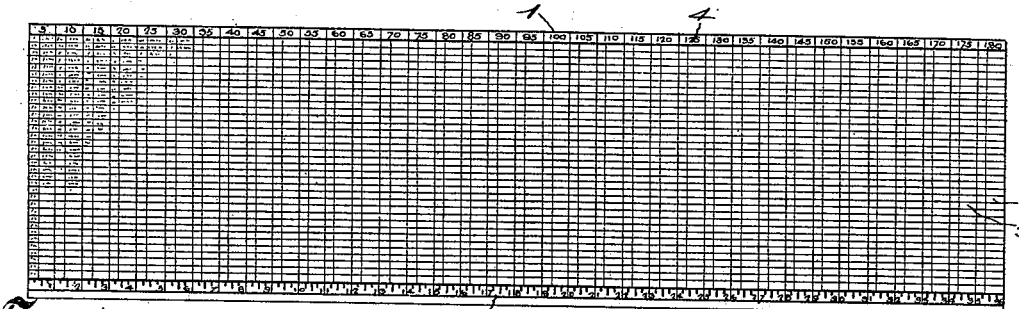

GEORGE H. MITCHELL, OF CHARLESTON, MISSOURI, ASSIGNOR OF ONE-HALF TO WILLIAM P. WRIGHT, OF SAME PLACE.

COMPUTING-MEASURE.

SPECIFICATION forming part of Letters Patent No. 652,722, dated June 26, 1900.

Application filed February 16, 1900. Serial No. 5,507. (No model.)

*To all whom it may concern:*

Be it known that I, GEORGE H. MITCHELL, a citizen of the United States, residing at Charleston, in the county of Mississippi and State of Missouri, have invented a new and useful Computing-Measure, of which the following is a specification.

The invention relates to improvements in computing-measures.

The object of the present invention is to improve the construction of computing yard-measures and to provide a simple and comparatively inexpensive one adapted to have the price-columns conveniently arranged with relation to the inch-marks of a yard-measure, so that when a piece of material is measured the price of the same may be found in the column opposite the number or inch-mark indicating the quantity of the material measured.

A further object of the invention is to arrange the columns so that the price of a piece of material from an inch to a yard may be readily ascertained without the use of the measure or without laying off the material on the measure.

The invention consists in the construction and novel combination and arrangement of parts hereinafter fully described, illustrated in the accompanying drawings, and pointed out in the claim hereto appended.

In the drawings, Figure 1 is a plan view of a computing yard-measure constructed in accordance with this invention. Fig. 2 is an enlarged plan view of one end of the computing yard-measure.

Like numerals of reference designate corresponding parts in both figures of the drawings.

1 designates a computing yard-measure adapted to be arranged in the form of a yard-stick, or it may be constructed in the form of a strip or bar and inlaid or mortised in a shop-counter. The computing yard-measure is provided at one of its longitudinal edges with inch-graduations 2, and it is provided with transverse columns or spaces 3, arranged at right angles to the yard-measure formed by the inch-graduations 2. These transverse columns or spaces, which are an inch wide, agree with the inch-graduations 2, and the computing-measure is provided at its other longitudinal edge with numbers 4, indicating the price per yard of dry goods or other material designed to be measured and sold in connection with the computing yard-measure. The space between the price-per-yard numeral and the inch-graduations in each of the transverse columns is divided into a series of thirty-six small spaces, and a series of numerals 5 is arranged consecutively from "1" to "36" at one side of the transverse column and represent or correspond with the inches of the yard-measure. At the other side of each transverse column is a series of figures 6, indicating the price of the material from one inch to thirty-six inches, calculated on a basis of the price-per-yard indicator at the head of the column. For instance, take the column at the right-hand end of the measure. The price per yard indicated at the head of the column is one dollar and eighty cents and the figures indicating the price from one inch to thirty-six inches are obtained by dividing one hundred and eighty by thirty-six. The result, which is five, indicates the cost of one inch of material selling for one dollar and eighty cents a yard and is placed opposite the numeral "1," as clearly shown in Fig. 2 of the accompanying drawings. The other figures of the column 6 are obtained by multiplying the number of inches by five, as will be readily apparent. The price per yard increases in regular arithmetical progression, the second column from the right-hand end being calculated on a basis of one dollar and seventy-five cents per yard, the third column from the end on a basis of one dollar and seventy cents per yard, and so on to the column at the left-hand end. By this arrangement the price of any number of inches can be readily ascertained at any price per yard on the scale by consulting the column opposite to the price per yard and reading the amount opposite the number indicating the inches.

In laying off material on the measure the price of the quantity may be ascertained from the column of figures opposite the inch-graduations or corresponding to the same by referring to the last column. For instance, suppose the quantity of material measured is thirty inches. By referring to the figures of column No. 6 for the price per yard—say one dollar and eighty cents—and the corresponding numeral of the series 5, which is "36," and reading the amount opposite the numeral "36" of the column 3 at the thirty-inch mark it will be seen that the cost, one dollar and fifty cents, may be quickly ascertained. Take another example. Suppose that the quantity of material measured off is thirty-four inches and the price of the material is one dollar and fifty cents per yard. The numeral opposite the one-dollar-and-fifty-cents space of the end column 3 is "30," and by reading the number opposite the numeral "30" of the column 3 at the point measured, the thirty-four-inch mark, the amount, one dollar and forty-one cents and a fraction, is found. This can be verified by the numbers of the one-dollar-and-fifty-cents column of figures, thirty-four inches costing one dollar and forty-one cents and a fraction. In computing the figures of the various columns the fractions in many instances have been approximated; but absolute accuracy may be readily obtained where it is necessary or desirable, and in most instances the scale will be prepared with reference to the commercial custom of rejecting all fractions under a half of a cent and adding all fractions over a half of a cent.

It will be seen that the computing yard-measure is simple in its construction and arrangement, and by its arrangement the numbers are capable of a double use and greatly facilitate the sale of various kinds of material, such as dry goods and the like. It will also be apparent that the scale may be prepared with reference to any set of price-per-yard scale or graduations wherein the numbers increase in arithmetical progression.

What is claimed is—

A computing yard-measure provided with inch-graduations and having transverse columns of figures arranged in pairs and corresponding to the inch-graduations, one of the columns of each pair or set consisting of numerals from "1" to "36" and the other column indicating the price in inches, a series of characters located at the head of the columns and indicating the price per yard, said characters and price-columns increasing in regular progression and the last pair or set of columns forming an index for the other columns and the figures of the latter agreeing with the figures of the former for enabling the price of a piece of material to be read at the point where the material is measured, substantially as described.

In testimony that I claim the foregoing as my own I have hereto affixed my signature in the presence of two witnesses.

GEORGE H. MITCHELL.

Witnesses:
  E. J. DEAL,
  O. W. JUSLYN.